A. S. DONALDSON.
GRAILING MACHINE.
APPLICATION FILED OCT. 19, 1918.

1,426,364.

Patented Aug. 22, 1922.
2 SHEETS—SHEET 1.

Inventor
Alfred S Donaldson
By his Attorneys

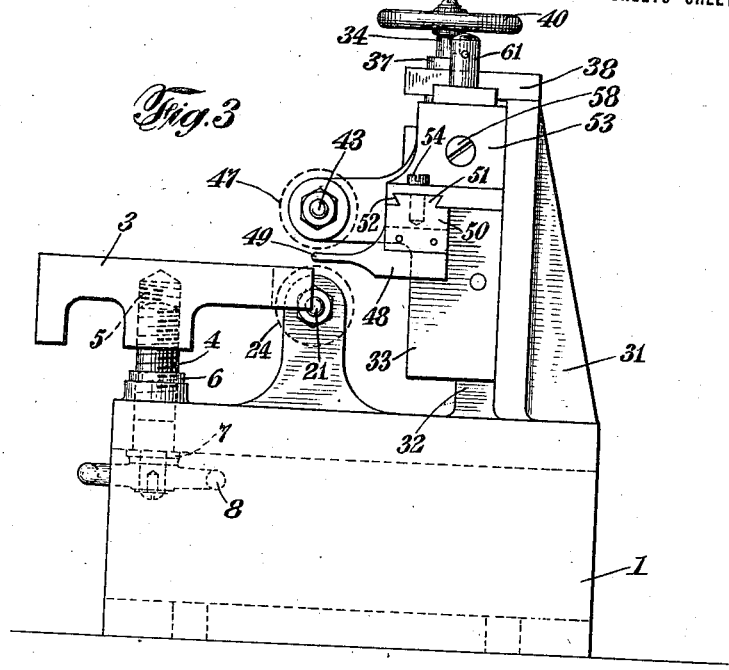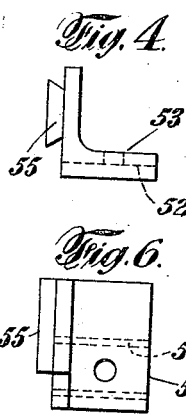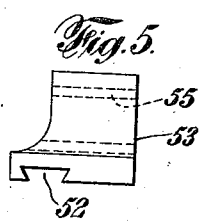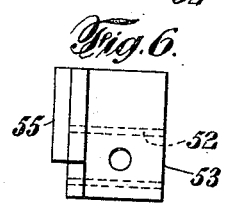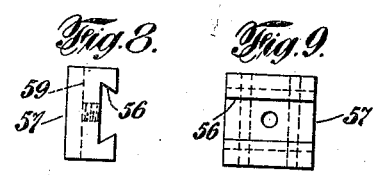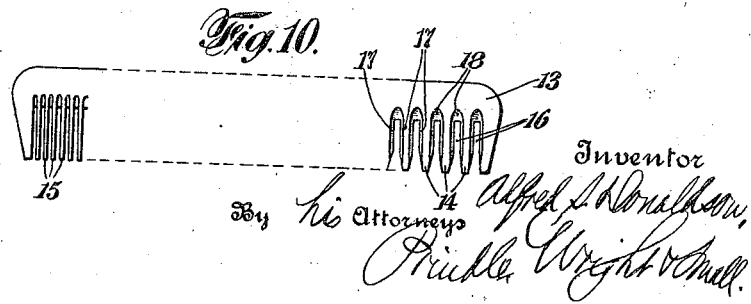

UNITED STATES PATENT OFFICE.

ALFRED S. DONALDSON, OF NEWARK, NEW JERSEY, ASSIGNOR TO E. I. DU PONT DE NEMOURS & COMPANY, OF WILMINGTON, DELAWARE, A CORPORATION OF DELAWARE.

GRAILING MACHINE.

1,426,364.  Specification of Letters Patent.  Patented Aug. 22, 1922.

Application filed October 19, 1918. Serial No. 258,874.

*To all whom it may concern:*

Be it known that I, ALFRED S. DONALDSON, of Newark, in the county of Essex and State of New Jersey, have invented a certain new and useful Improvement in Grailing Machines, and do hereby declare that the following is a full, clear, and exact description thereof.

My invention relates particularly to a machine designed for grailing, that is to say, which is provided for the purpose of shaping the edges of, and grooving the teeth of combs, which may be made out of any desired material, but which may be, for example, made from a plastic composition containing nitrocellulose and camphor.

The object of my invention is to provide a grailing machine which will not only operate upon one side of a set of large teeth in a comb, but which will operate simultaneously upon the other side thereof, and which is adapted to operate also simultaneously upon both sides of a set of small teeth in a comb. A further object is to decrease the cost of manufacturing combs by providing a machine of this character, while at the same time increasing the uniformity of the product.

Further objects of my invention will appear from the detailed description thereof contained hereinafter.

While my invention is capable of embodiment in many different forms, for the purpose of illustration I have shown only one type of my invention in the accompanying drawings, in which:

Fig. 3 is an end view of the same.

Fig. 4 is a side elevation of a bracket.

Fig. 5 is an end view of the same.

Fig. 6 is a plan view of the same.

Fig. 7 is a plan view of a slide.

Fig. 8 is a side elevation of the same.

Fig. 9 is a rear elevation of the same, and

Fig. 10 is a separate view of the comb.

Figure 1:
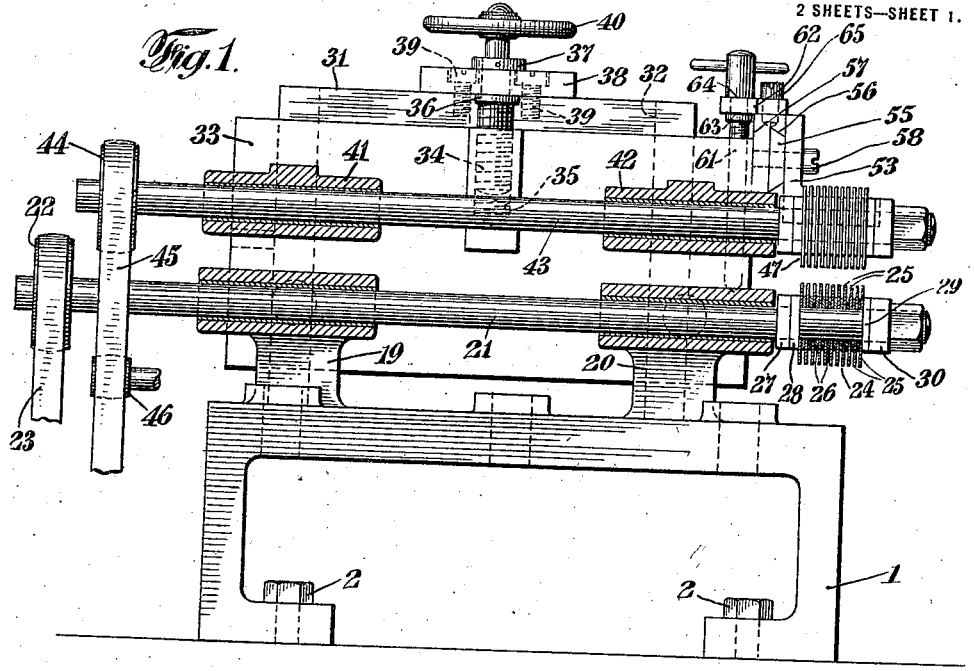
Fig. 1 is a side elevation partly in section of a machine made in accordance with my invention.
Figure 2:
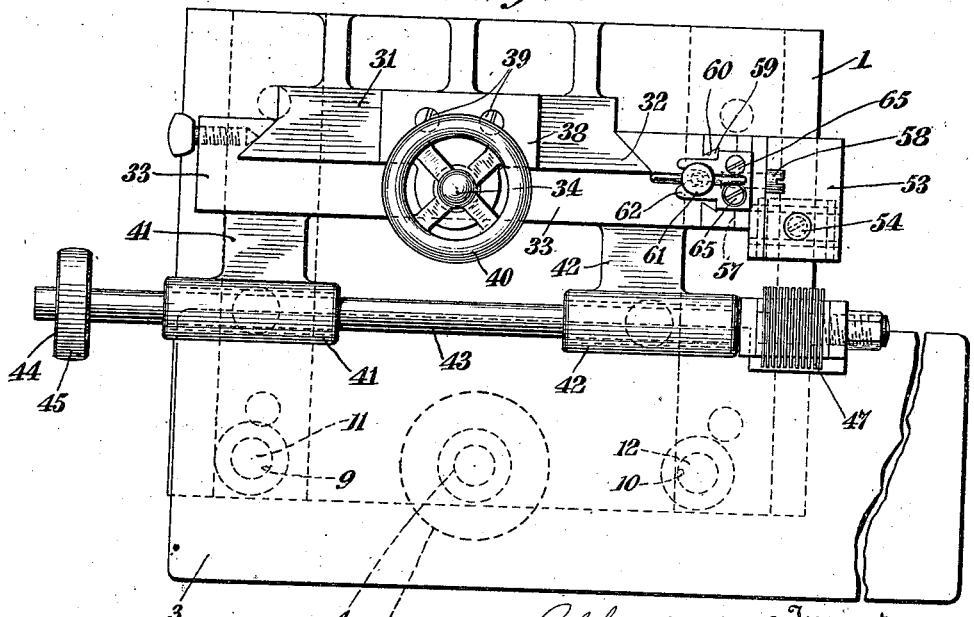
Fig. 2 is a plan view of the same.

In the drawings, I have shown a main casting or frame 1 having bolts 2 to attach the same to any suitable support. The main casting 1 supports at the front thereof a vertically adjustable table 3 which may be adapted to be adjusted by means of a screw 4 extending into a screw-threaded hole 5 therein, which screw 4 may have two fixed washers 6 and 7 attached thereto above and below the frame 1, through which the screw 4 passes, and it may be provided also with an operating handle 8 below the frame 1. At its two ends, the table 3 may be provided with two circular openings 9 and 10 to receive pins 11 and 12 secured in the main frame 1, and adapted to act as guides for the table 3. Said table 3 is designed to support a comb 13 or the like while being operated upon by the machine. The comb 13 prior to being operated upon by the machine, may have a plurality of large teeth 14, and a plurality of small teeth 15 which may have been formed on the comb blank merely by sawing recesses 16. A purpose of the machine may be to provide shaped edges 17 for the teeth and grooves 18 between the teeth. To the rear of the table 3 the frame 1 may be provided with a pair of spindle bearings 19 and 20 to receive a fixed spindle 21 which may carry a pulley 22 designed to be driven by a belt 23 from any suitable source of power. Upon the other end of the spindle 21 there may be a grailing cutter 24 comprised of a plurality of disc saws 25 separated by washers 26, and held in place against a shoulder 27 and a washer 28 upon the spindle 21 by means of a washer 29 and a shouldered nut 30 which may be screw-threaded on the spindle 21. To the rear of the bearings 19 and 20 the frame 1 may carry an upright extension 31 on which there may be a dove-tailed forward extension 32 to receive a vertically sliding spindle carriage 33. The carriage 33 may be moved by a screw 34 screw-threaded in a hole 35 in the carriage 33, which screw may have shoulders 36 and 37 to position it in a plate 38 which may be secured by screws 39 to the top of the forward extension 32. The screw 34 at its upper end may have an operating handle 40. On the carriage 33 there may be two spindle bearings 41 and 42 to receive an adjustable spindle 43 having a pulley 44 at one end, driven by a belt 45 from any suitable source of power, and kept taut by an idler 46. On the other end of said shaft there may be another grailing cutter 47 constructed the same as the grailing cutter 24. Upon one end of the carriage 33 there may be, furthermore adjustably supported a toothed stop 48 comprising a plurality of teeth 49 adapted to fit in the recesses 16 of for example the comb 13. This stop 48 may be supported upon a horizontally adjustable slide 50 which may have a dove-tailed extension 51 fitting in a horizontal dove-tailed groove 52 on a right angle bracket 53, which may carry a screw 54 to hold the slide 50 in its adjusted position. The right angle bracket 53 furthermore may have a horizontal dove-tailed extension 55 located in a position at right angles to the extension 51, which may fit in a dove-tailed groove 56 on a slide 57, a screw 58 or the like being provided to hold the dove-tailed extension 55 in its adjusted position. The slide 57 may be furthermore provided with a vertically extending dove-tailed groove 59 fitting over a dove-tailed extension 60 on the end of the carriage 33, and an adjusting screw 61 may be screw-threaded in the carriage 33 to adjust the position of the slide 57 by co-operation with a yoke plate 62 or the like, which may fit between shoulders 63 and 64 on the screw 61, and may be secured by screws 65 to the slide 57.

In the operation of my invention, a comb or the like of any thickness and with any sized teeth may be placed upon the table 3. The position of the adjustable spindle may be then adjusted in a vertical direction by the operation of the handle 40 to the extent required by the thickness of the comb and the depth of the groove 18 desired. The position of the stop 48 may be then adjusted also according to the thickness of the comb, the width of the teeth, and the length of the recesses 16, as compared with the length of the grooves 18 desired, by movement of the stop 48 in the three planes at right angles to one another. Thereupon the comb 13 is fed between the two grailing cutters 24 and 47 until the ends of the recesses 16 in the comb are stopped by the ends of the teeth 49 on the stop 48. The comb 13 may be then moved until the next set of recesses 16 are opposite the teeth 49, and the operation repeated in this manner until the entire comb has been grailed. Of course, where there are a large number of combs to be finished, each of which contains large and small teeth, the large teeth of the entire number of combs may be grailed, and thereafter the apparatus may be reset and the small teeth in all of the combs may then be grailed. In this way, it will be seen that both sides of the particular set of teeth operated upon, whether large or small, are grailed at the same time and notwithstanding the dimensions of the comb and teeth carried thereby.

While I have described my invention above in detail I wish it to be understood that many changes may be made therein without departing from the spirit thereof.

I claim:

1. In a grailing machine, in combination, a rotary disc cutter for grailing one side of a comb, a second cutter for grailing the other side of a comb, the two being arranged to receive the comb between them as fed from one side of the cutters, a comb stop comprising a tooth base and a substantially straight stop tooth therewith and located in the plane of the comb-receiving space between the cutters, and overhanging said base in a direction opposite to the direction of feed of the comb to the cutters for a distance at least as great as the length of the comb tooth to be grailed and of a width to pass between the comb teeth.

2. In a grailing machine, in combination, a rotary disc cutter for grailing one side of a comb, a second cutter for grailing the other side of the comb, the two being arranged to receive the comb between them as fed from the one side of said cutters, and a comb stop having a substantially straight tooth located at the other side of the cutters, such stop comprising a tooth base with said tooth projecting forwardly therefrom in the plane of the comb-receiving space between the cutters and for a distance at least as great as the length of the comb tooth to be grailed, and of a width to pass between the comb teeth.

3. In a grailing machine, in combination, a rotary disc cutter for grailing one side of a comb, a second cutter for grailing the other side of the comb, the two being spaced from each other and arranged to receive the comb between them in said space, a comb supporting structure located at one side of said cutters and having a work table with its forward edge spaced from, and located at said side of, the cutters and substantially opposite said space, a comb-stop-supporting structure located at the other side of the cutter, and a comb stop carried by said second named structure substantially opposite said space and in position to be contacted by the comb as the same is fed forward from said table edge and through the space between the cutters.

4. In a grailing machine, in combination, a rotary disc cutter for grailing one side of the comb, a second cutter for grailing the other side of the comb, said cutters being spaced from each other to receive the comb between them, a work table located at one side of the cutters and means for adjusting such table in a plane parallel to the plane of the cutters, thereby to adjust its position and that of the tabled comb with respect to one of the cutters and determine the depth of the cut of such cutter, a comb stop, relatively thin in the direction of the plane of the cutters to permit approach to the cutters to abut the comb, and means for adjusting said stop, in a plane parallel to the plane of the cutters, in correspondence with the adjustment of said table, thereby to locate said thin stop in position to suitably abut the tabled comb.

5. In a grailing machine, in combination, a rotary disc cutter for grailing one side of the comb, a second cutter for grailing the other side of the comb, said cutters being spaced from each other to receive the comb between them, a work table located at one side of the cutters and means for adjusting such table in a plane parallel to the plane of the cutters thereby to adjust its position and that of the tabled comb with respect to one of the cutters and determine the depth of cut of such cutter, a comb stop having a blade-like tooth, relatively narrow to permit projection between the cutters, and adapted for projection between the comb teeth to abut the comb shank between said teeth, and means for adjusting said stop tooth in a plane parallel to the plane of the cutters, in correspondence with the adjustment of said table, thereby to locate said narrow blade-like tooth in position to suitably abut the shank of the tabled comb.

6. In a grailing machine, in combination, a pair of rotary disc cutters arranged the one above the other and spaced from each other to receive the comb to be grailed therebetween, a work table located at one side of the cutters substantially opposite the space therebetween, means for vertically adjusting said table thereby to adjust said table with respect to one of said cutters and determine the depth of cut of such cutter, a stop-tooth-supporting structure located at the other side of the cutters and carrying a stop tooth opposite said space and projecting forwardly, in the plane of the comb-receiving space between the cutters, for a distance at least as great as the length of the comb tooth to be grailed, such tooth being blade-like, and relatively narrow to permit projection between the cutters, and adapted for projection between the comb teeth to abut the comb shank between said teeth, and means for vertically adjusting said stop-tooth-supporting structure in correspondence with the adjustment of the table, thereby to locate said narrow blade in position to suitably abut the shank of the tabled comb.

7. In combination, a rotary disc cutter for grailing one side of a comb, a cutter for grailing the other side of the comb, and a toothed stop for the comb having an adjustable supporting means adapted to be adjusted in three planes at right angles to one another.

8. In combination, a rotary disc cutter for grailing one side of a comb, a cutter for grailing the other side of the comb, adjustable with regard to the first mentioned cutter, and a toothed stop for the comb having an adjustable supporting means adapted to be adjusted in three planes at right angles to one another.

In testimony that I claim the foregoing I have hereunto set my hand.

ALFRED S. DONALDSON.

Witnesses:
LUTHER D. REED,
HENRY B. CHAFFEE.